United States Patent [19]
Arnett

[11] 3,822,373
[45] July 2, 1974

[54] METHOD AND APPARATUS FOR FEEDING WIRE FOR WELDING

[75] Inventor: James C. Arnett, La Canada, Calif.

[73] Assignee: California Institute of Technology, Pasadena, Calif.

[22] Filed: Aug. 29, 1972

[21] Appl. No.: 284,757

[52] U.S. Cl. .................................. 219/56, 219/103
[51] Int. Cl. ............................................. B23k 9/00
[58] Field of Search ....... 219/56, 58, 103, 104, 107, 219/117; 228/1

[56] References Cited
UNITED STATES PATENTS

| | | | |
|---|---|---|---|
| 2,187,129 | 1/1940 | Kramer | 219/56 X |
| 2,379,135 | 6/1945 | Ekstedt et al. | 219/56 X |
| 3,312,810 | 4/1967 | Neumeier | 219/103 |
| 3,342,972 | 9/1967 | Penberg | 219/119 |
| 3,532,852 | 10/1970 | Larson | 219/103 |

Primary Examiner—C. L. Albritton
Assistant Examiner—L. A. Schutzman
Attorney, Agent, or Firm—Lindenberg, Freilich, Wasserman, Rosen and Fernandez

[57] ABSTRACT

Apparatus for welding a continuous insulated wire to numerous terminal pins of a circuit board, including a solid central electrode which presses the wire against the terminal pin to rupture the insulation and then weld the wire to the pin. A concentric second electrode has a pair of openings on diametrically opposite sides of the center electrode for closely guiding the wire across the face of the central electrode, one of the openings being a hole that completely surrounds the wire and the opposite opening being a slot which is open at its bottom end. After each point of the wire is welded to a terminal pin, the electrodes are lifted and then initially moved parallel to the axis of the wire portion that is welded to the previous terminal pin, and only then is the direction of electrode movement changed to carry it to the next terminal pin.

10 Claims, 11 Drawing Figures

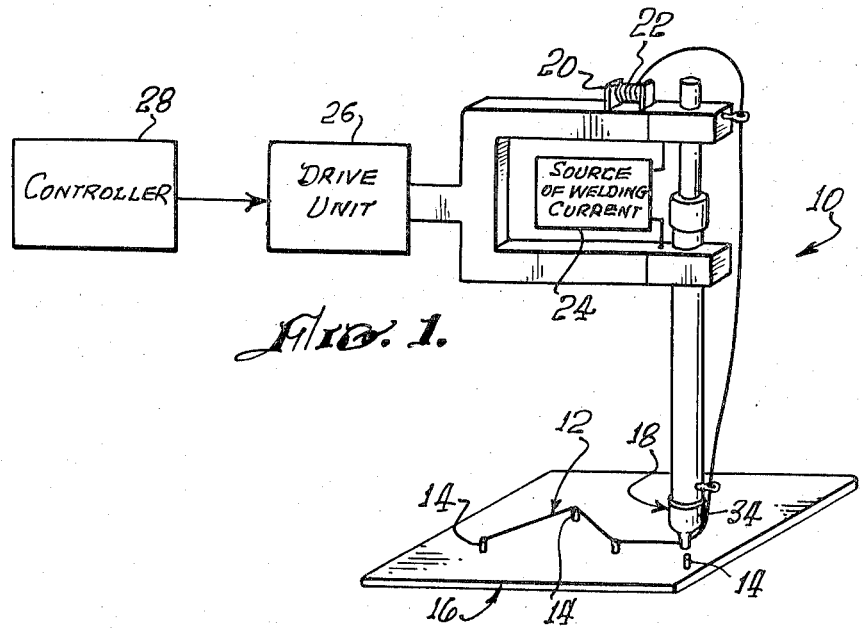
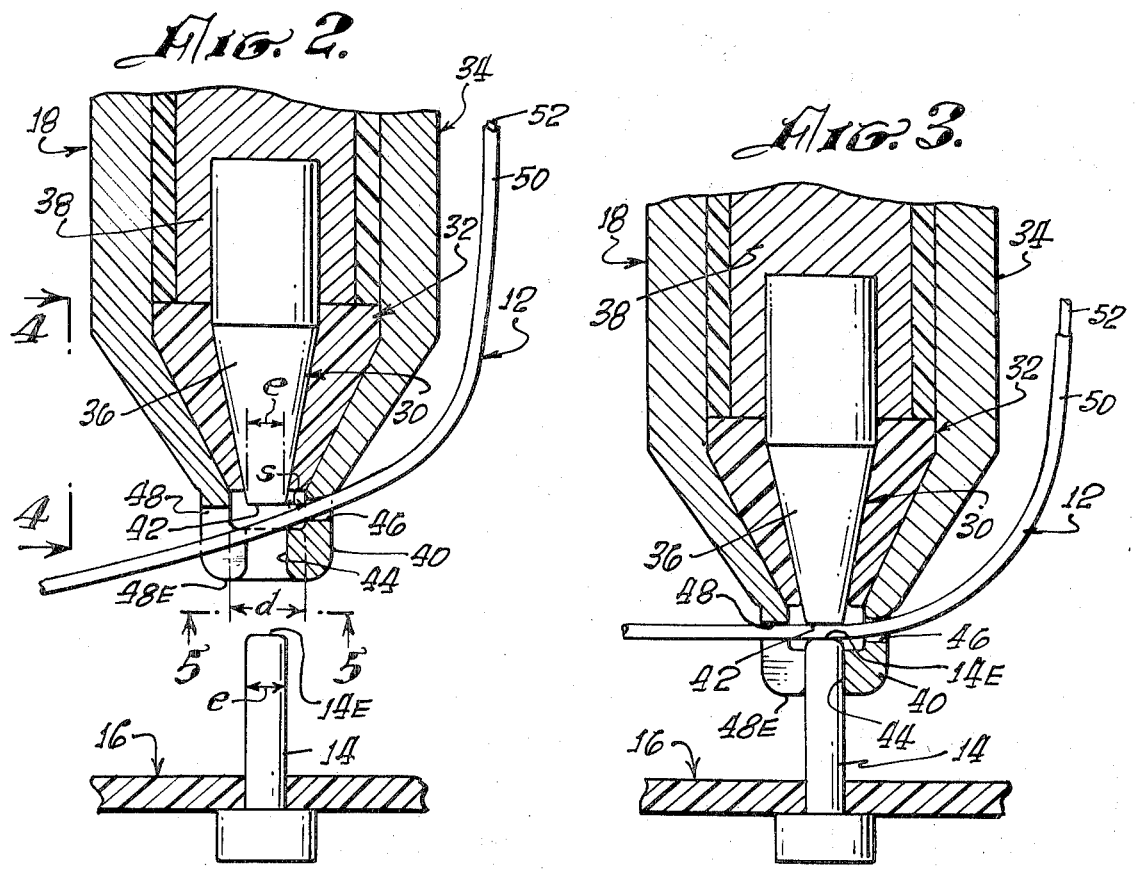

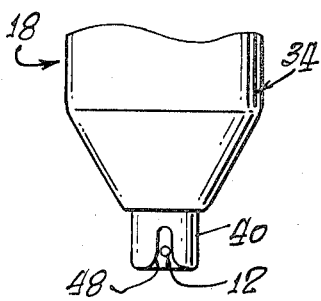
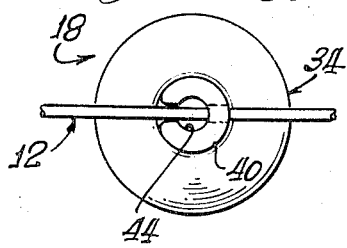
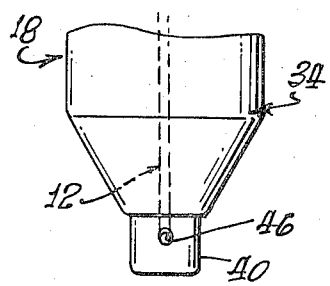
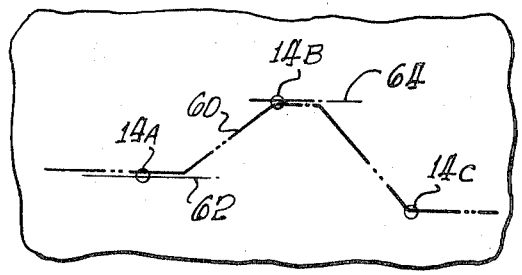
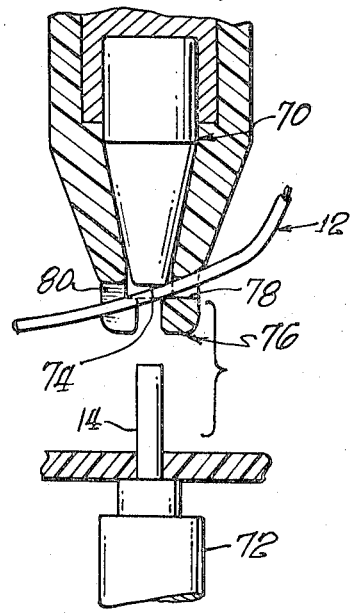
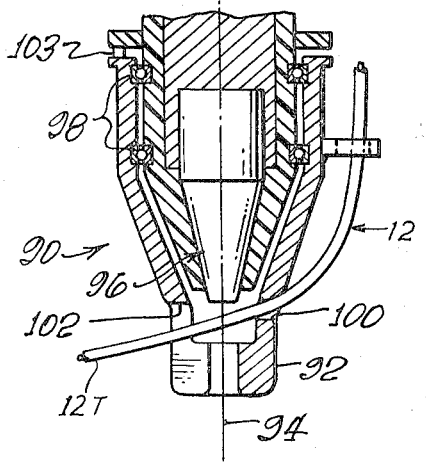
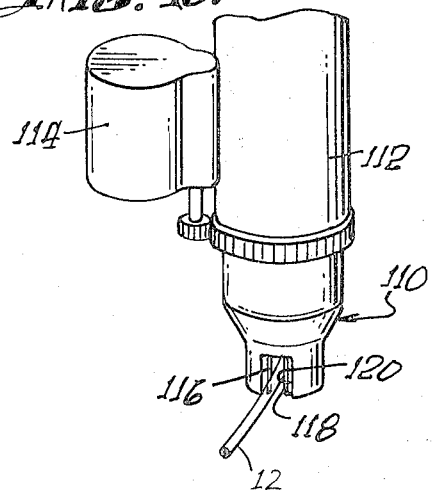
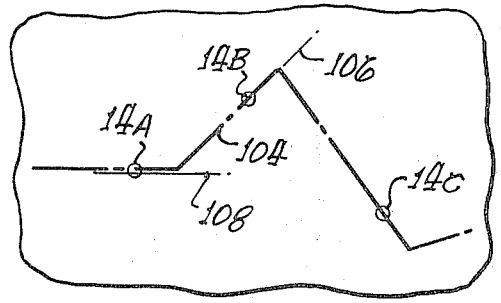

METHOD AND APPARATUS FOR FEEDING WIRE FOR WELDING

ORIGIN OF THE INVENTION

The invention described herein was made in the performance of work under a NASA contract and is subject to the provision of Section 305 of the National Aeronautics and Space Act of 1958, public Law 85–568 (72 Stat., 435; 42 USC 2457).

BACKGROUND OF THE INVENTION

This invention relates to welding, and more particularly to apparatus for sequentially welding a continuous wire to terminals.

Complex electronic assemblies include large numbers of closely spaced, miniature terminals which must be electrically interconnected. This may be accomplished by welding a continuous insulated wire to the terminals. One method for breaking through the insulation involves pressing a welding electrode hard against the wire to rupture the insulation. The pressing force is then reduced and welding currents are passed through the electrode to weld the central conductor of the wire to the terminal pin. A method and apparatus for performing such welding is described in U.S. Pat. No. 3,596,077 issued July 27, 1971, and owned by the same assignee as the present patent application.

In order to rupture the insulation of a wire, it is necessary to press the electrode against the wire with a high force, and to accurately locate the wire so that it remains between the electrode and the terminal pin instead of slipping out from between them. Accurate location of the wire has been achieved by feeding the wire through an axially-extending passageway formed in the electrode, the wire emerging from the electrode then bending and extending radially along the face of the electrode. The hole in the small electrode weakens it, and the combination of high local pressures and heating results in a greatly reduced life for such an electrode. The electrode can be replaced if it breaks, but such breakage often occurs in the middle of a welding sequence, when the wire has been welded to only some of the terminal pins. Since the wire extends through a passage in the electrode, the electrode cannot be readily removed without cutting the wire. Substantial time may be wasted in cutting and trimming the wire and restarting the welding operation, and in some cases the circuit may have to be discarded.

SUMMARY OF THE INVENTION

In accordance with one embodiment of the present invention, wire welding apparatus is provided which welds a continuous insulated wire to numerous terminals, wherein the electrode that ruptures the insulation has a long life and can be replaced in the middle of a welding sequence without cutting the wire. The apparatus includes a pair of concentric electrodes, the inner electrode having a solid face portion for pressing a wire against the terminal pin, and the outer electrode having a hollow portion extending beyond the face of the inner electrode. The outer electrode has a pair of openings on opposite sides of the inner electrode for closely guiding a wire diametrically across the face of the inner electrode. One of the openings in the outer electrode is a hole that completely surrounds the wire, while the other opening is a slot that is open at the bottom. The outer electrode closely fits over a terminal pin and holds the wire so it lies between the pin and the inner electrode.

The wire is normally welded to a large number of terminal pins that are not arranged along a straight line, so that the electrodes may follow a zig-zag course around the circuit board. After a point on the wire is welded to a terminal pin, the electrodes are moved a small distance upwardly and then are initially moved in a direction substantially parallel to the axis of the wire portion that is welded to the previous terminal. Only after moving a distance in the initial direction is the direction of electrode movement changed to bring it to the next terminal pin. Movement parallel to the axis of the previously welded wire portion minimizes stresses on the weld.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 1 is a perspective view of welding apparatus constructed in accordance with one embodiment of the present invention, shown in the course of a welding sequence;

FIG. 2 is an enlarged sectional side view of the welding electrode assembly and a portion of the circuit board, shown prior to a welding operation;

FIG. 3 is a view similar to FIG. 2, but showing the apparatus during a welding operation;

FIG. 4 is a partial view taken on the line 4—4 of FIG. 2;

FIG. 5 is a partial bottom view taken on the line 5—5 of FIG. 2;

FIG. 5A is a view taken on the line 5A—5A of FIG. 5;

FIG. 6 is a partial plan view of the circuit board of FIG. 1, indicating the path of the electrode assembly during a series of welding operations;

FIG. 7 is a partial sectional side view of an electrode assembly constructed in accordance with another embodiment of the invention;

FIG. 8 is a partial perspective view of the apparatus of FIG. 7;

FIG. 9 is a partial plan view of a circuit board of FIG. 7, indicating the path of the electrode assembly thereover; and FIG. 10 is a partial perspective view of an electrode apparatus constructed in accordance with still another embodiment of the invention.

DESCRIPTION OF THE PREFERRED EMBODIMENTS

FIG. 1 illustrates a welding apparatus 10 which welds a continuous insulated wire 12 to numerous terminal pins or terminals 14 of an integrated circuit 16. The welding apparatus includes an electrode assembly 18, a holder 20 that holds a spool 22 containing a quantity of wire for feeding it through the electrode assembly, and a power source 24 for supplying welding currents to the electrode assembly. A drive unit 26 moves the electrode assembly to different positions over the circuit board 16 and down against and up away from the terminal pins 14. A controller 28 is programmed to operate the drive unit 26 so that the electrode assembly moves over a predetermined course corresponding to the locations of the terminal pins for the particular circuit 16.

FIGS. 2–5 illustrate details of the electrode assembly 18 which welds points along the wire 12 to different terminal pins or terminals 14. The electrode assembly includes an inner electrode 30, an insulator 32 surrounding the inner electrode, and an outer electrode 34 concentric with the inner electrode. The inner electrode 30 includes a tip 36 of a material such as tungsten carbide, which can withstand high pressures and temperatures, and a rod 38 that holds the tip. The tip 36 has a concave wire abutting surface or welding face 42. The outer electrode 34 is tubular and has an end portion 40 which extends beyond the welding face 42 of the inner electrode. The end portion 40 of the outer electrode has an axially extending passage 44 which closely receives the terminal pin 14 and establishes electrical contact with it when the electrode assembly is lowered onto the pin. The end portion 40 of the outer electrode also has a pair of openings 46, 48 on diametrically opposite sides of the face 42 of the inner electrode, that is, on opposite sides of the region immediately in front of the face 42 of the inner electrode. The wire 12 extends from the spool 22 through the opening 46, diametrically across the face 42 of the inner electrode, and through the other opening 48 in the outer electrode to the previous terminal to which the wire is welded. The first opening 46 in the outer electrode is a hole which substantially completely surrounds the wire 12. The second opening 48 in the outer electrode is a slot which is open at the end 48E which is furthest from the inner electrode 30. The wire withdraws from the bottom end of the slot when the electrode assembly is lifted from the terminal pin after welding the wire thereto.

The welding of a point along the wire 12 to the terminal pin 14 is accomplished by lowering the electrode assembly 18 to the position shown in FIG. 3 wherein the terminal pin 14 is received in the outer electrode passage 44 and the wire 12 is pressed between the face 42 of the inner electrode and the flattened upper end 14E of the terminal pin. The inner electrode 30 is pressed down with a large force to rupture the insulation 50 of the wire 12, so that both the inner electrode 30 and terminal pin 14 make contact with the inner conductor 52 of the wire. After rupturing the insulation, the downward force on the inner electrode is reduced to a lower level which is suitable for welding. Welding currents are then passed serially through the inner and outer electrodes 30, 34, so that the currents pass through the central conductor 52 of the wire and the pin 14, thereby welding the central conductor to the pin. The electrode assembly 18 is then lifted off the terminal pin and moved laterally over the circuit board in a path that brings it to a next terminal where the welding procedure is repeated. During such movement, the wire 12 is payed off the spool 22 and moves through the openings in the outer electrode.

The sequence of operations, and particularly the rupture of insulation, requires close control of the wire position with respect to the inner electrode's face 42 and the top of the pin 14. In the prior art, this was accomplished by passing the wire through an axial passage in the electrode which supplied the force for rupturing the insulation. The hollow electrode had a relatively short life, and replacement of the electrode necessitated cutting of the wire extending through it. The solid electrode 30 is stronger and therefore has a longer life, and it permits replacement without cutting the wire 12. However, the fact that the wire is not guided by the same electrode which ruptures it means that care must be taken to obtain close control of the wire position. The end portion 40 of the outer electrode has a hollow region 54 of a relatively small diameter $d$ where it surrounds the face 42 of the inner electrode. This diameter $d$ is preferably small enough so that the radial distance $s$ between the opening 46 that guides the wire across the face of the electrode is smaller than the diameter $e$ of the terminal pin 14, in order to reliably maintain the wire at the electrode face 42. The end portion 40 of the outer electrode is of a smaller diameter at its lower end to closely receive the terminal pin 14. It may be noted that the opposite openings 46, 48 in the outer electrode extend up to a position which is at least even with the face 42 of the inner electrode. As a result, when the wire 12 is pressed against the face of the inner electrode it can extend substantially along an imaginary straight line that connects the openings 46, 48 instead of being bent up. The elimination of sharp bends in the wire helps to eliminate breakage.

The continuous wire often must be welded to a large number of terminal pins that are positioned in a non-orderly fashion, that is, the pins are not arranged along a straight line. Many prior art welding systems are used only to connect a wire to two terminals, so that the welding electrodes can always move in a straight line during their welding sequence. Where three or more non-aligned (not in a straight line) terminals must be joined, so that the welding assembly must follow a zig-zag path, special care must be taken to prevent failure of the welds. FIG. 6 illustrates the path 60 of the electrode assembly in moving between three terminal pins 14A, 14B, and 14C which are non-aligned. When the electrode assembly welds the wire to the first terminal 14A, the wire extends along a welding axis 62 which is determined by the openings in the outer electrode through which the wire extends. After the weld is made, the electrodes are lifted a small distance from the terminal pin so that the outer electrode is clear of the pin, and the electrode assembly is then moved laterally along a path that brings it to the next terminal pin 14B. If the electrode assembly were to move directly towards the next pin 14B, the wire would be pulled sharply to one side and create large shear stresses in the weld at 14A. In order to minimize such stresses, the electrode assembly is preferably moved initially parallel to the weld axis 62, and only after the electrode has moved a substantial distance is its direction of movement changed to bring it to the next terminal pin 14B. The fact that the electrode assembly is spaced a substantial distance from the terminal pin 14A when it begins moving at an angle to the weld axis 62, means that only a relatively small shear stress is applied to the previous weld. After welding at the next terminal pin 14B, the electrode assembly is lifted and initially moved substantially parallel to the weld axis 64 of the wire portion welded to the pin 14B, and this process is repeated for each subsequent terminal pin.

The control of electrode assembly movement can be accomplished automatically by the controller 28 indicated in FIG. 1, which can be programmed to move to the successive terminals in a route which results in initial movement away from each terminal pin substantially along the axis of the wire portion welded to that terminal pin. The movements may be made only in two perpendicular directions, and in some machines the circuit board may be moved instead of, or in addition to the electrode assembly, so that the movements may be referred to as relative movements of the electrode assembly to the circuit board.

The pair of electrodes that are used in resistance welding can be located in opposed relationship at opposite ends of the terminal pin, as illustrated in FIG. 7. In this case, one electrode 70 which presses the wire 12 against the terminal pin 14 is located above pin, while the other electrode 72 is located below the pin. The wire 12 is guided diametrically across the face 74 of the upper electrode by a separate guide member 76 that surrounds the upper electrode 70. The guide member 76 is constructed of insulative material, and it includes a pair of openings 78, 80 on diametrically opposite sides of the center electrode 70, that is, on opposite sides of the space immediately in front of the face 74 of the electrode which presses the wire against the terminal. One of the openings 78 is a hole which completely surrounds the wire 12 to prevent it from falling out, and the other opening 80 is a slot which is open at the bottom. Welding is accomplished in a manner similar to that in the previously described embodiment of the invention, except that the lower electrode 72 presses against the bottom of the terminal pin to complete the welding current path.

When the electrode assembly moves to the different terminal pins in the embodiments of the invention described above, the wire 12 passes through the wire guide formed by the outer electrode or a separate wire guiding member. Passage of the wire through the guiding means is hampered if the electrode assembly is moving largely perpendicular to the axis of the wire portion extending therethrough. Paying out the wire can be facilitated by mounting the guiding means so that it can rotate about a vertical axis. FIG. 8 illustrates an electrode assembly 90 which includes an outer electrode 92 which can rotate about an axis 94 which is substantially perpendicular to the length of the inner electrode 96. The outer electrode 92 is mounted by bearings 98 that permit it to freely rotate so that the guiding openings 100, 102 in the outer electrode can be aligned with the wire portion 12T which trails behind the electrode assembly. A slip ring 103 supplies current to the outer electrode. A welding sequence utilizing this electrode assembly can be carried out in the manner indicated in FIG. 9 which shows the path 104 of the electrode assembly during the welding of the wire to the three terminal pins, 14A, 14B and 14C. The fact that the wire-guiding outer electrode rotates, means that the axes of the welds at the different terminals can be differently oriented. Thus, at the terminal 14B, the weld axis 106 is not parallel to the weld axis 108 existing at the terminal 14A. The electrode assembly initially moves away from each terminal in a direction substantially parallel to the weld axis even though this direction is different for each terminal. Although the outer electrode or other guiding means can be merely rotatably mounted so that the lateral component of tension in the wire rotates it, it is possible to utilize a motor to rotate the guiding means.

FIG. 10 illustrates an apparatus similar to that of FIG. 8, except that the outer electrode 110 which is rotatably mounted on a support 112, is rotated by a motor 114. A pair of switches 116, 118 located on either side of a slot 120 through which the wire 12 passes in extension towards the previous terminal, sense deviation of the electrode orientation from a desired direction. When one of these switches 116 or 118 is closed, the motor 114 is energized to rotate the outer electrode 110 in a direction which reorients the electrode.

Thus, the invention provides an apparatus and method for welding a continuous wire to a plurality of terminals, the invention being especially useful in the welding of an insulated wire to a plurality of terminal pins of a circuit board. The apparatus includes a welding electrode that applies electrical, ultrasonic or other welding energy to the wire and which also serves to press the wire against the terminal. The apparatus also includes guiding means which closely guides the wire in extension across the entire face of the electrode. The guiding means includes a pair of openings on diametrically opposite sides of the electrode face, that is, on opposite sides of the space immediately in front of the electrode face. One opening, which receives wire from a supply spool, is an opening that substantially completely surrounds the wire to prevent its loss therefrom under normal operations, while the other opening is a slot that is open at the end furthest from the electrode face. Where an insulated wire is welded, the guiding means can be formed in an outer electrode that is concentric with the electrode that presses and holds the wire against the terminal. In the case of opposed electrode assemblies, the guiding means can be a separate member which may be constructed of insulative material. The guiding means can be mounted for rotation to facilitate the passage of wire therethrough. The welding of a continuous wire to three or more non-aligned terminals involves the initial movement of the electrode assembly off the terminal and then in a direction substantially parallel to the weld axis which is the axis of the wire portion welded to the previous terminal. Only after the electrode assembly has moved a distance away from the previous terminal along the weld axis is the direction of the electrode assembly changed to bring it to the next terminal.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. Wire welding apparatus for welding a continuous wire to a plurality of terminals comprising:
   an electrode having a wire-abutting surface for pressing a wire against a terminal;
   means connected to said electrode for supplying welding energy thereto while it presses the wire against the terminal, to weld the wire to the terminal;
   first and second guide means positioned on opposite sides of said electrode, for maintaining the wire in extension across the wire-abutting surface of the electrode;
   wire storage means positioned to hold the wire so that a portion extends therefrom through said first guide means, then across said electrode, and then through said second guide means; and
   means for moving said electrode and guide means relative to said terminals so the electrode and guide means are positioned sequentially at the terminals to weld different locations along the wire to the terminals;

said second guide means including walls forming a slot for fixing the lateral position of wire extending therethrough while permitting withdrawal of the wire through an open end of the slot without cutting it when the electrode and guide means are moved relative to the terminals.

2. The apparatus described in claim 1 wherein:

said second guide means is rotatably mounted about the electrode, whereby to facilitate the passage of wire through the second guide means when moving away from a terminal at any angle within a wide range.

3. The apparatus described in claim 1 including:

a second electrode concentric with and surrounding said first named electrode; and said guide means includes walls of said second electrode forming openings on either side of the first named electrode, said walls of said second electrode comprising said walls forming a slot in said second guide means.

4. Apparatus for welding a continuous wire to projecting pins of a circuit board comprising:

an inner electrode having a face;

a hollow outer electrode surrounding said inner electrode and extending past the face of the inner electrode, said outer electrode having a pair of openings on diametrically opposite sides of the hollow region lying in front of the inner electrode face;

means for guiding a wire in extension through said openings in the outer electrode, so the wire extends across the inner electrode face;

means for applying a welding current through said electrodes; and means for moving both said electrode and said guide means against and away from the pins.

5. The apparatus described in claim 4 wherein:

said means for guiding a wire includes means for holding a quantity of wire and passing it initially into a first of said openings in the outer electrode; and the second opening in the outer electrode forms a slot which is open at the end farthest from the face of the inner electrode.

6. The apparatus described in claim 4 wherein:

said inner and outer electrodes are in a fixed relative axial position during welding cycles; and said openings are located so that the wire can substantially touch the face of the inner electrode in passing through the hollow center of the outer electrode along an imaginary straight line that connects the openings in the outer electrode.

7. Wire welding apparatus for welding a continuous wire to a plurality of terminals comprising:

an electrode having a wire-abutting surface for pressing a wire against a terminal;

means connected to said electrode for supplying welding energy thereto while it presses the wire against the terminal, to weld the wire to the terminal;

first and second guide means positioned on opposite sides of said electrode, for guiding the wire in extension across the wire-abutting surface of the electrode;

wire storage means positioned to hold the wire so that a portion extends therefrom through said first guide means, then across said electrode, and then through said second guide means; and means for separating both said electrode and guide means from said terminals after the application of welding energy, and for repositioning the electrode and guide means at another terminal;

said second guide means being releasable from the uncut wire when the electrode and guide means moves away from the terminal, so that the guide means can be repositioned without severing the wire.

8. The apparatus described in claim 7 wherein:

said electrode and guide means are in a fixed axial relationship.

9. Apparatus for welding a continuous wire to projecting pins of a circuit board, said wire including a central conductor surrounded by insulation, said apparatus comprising:

an inner electrode having a face;

a hollow outer electrode surrounding said inner electrode and extending past the face of the inner electrode, said outer electrode having a pair of openings on diametrically opposite sides of the hollow region lying in front of the inner electrode face;

means for guiding a wire in extension through said openings in the outer electrode, so the wire extends across the inner electrode face;

means for pressing said inner electrode against said insulation covered wire with sufficient force to rupture said insulation to enable welding to occur, means for applying a welding current through said electrodes; and means for moving both said electrode and said guide means against and away from the pins.

10. Wire welding apparatus for welding a continuous wire that includes a central conductor surrounded by insulation, to a plurality of terminals comprising:

an electrode having a wire-abutting surface, for pressing a wire against a terminal, to rupture the insulation of the wire and then press the central conductor against the terminal;

means connected to said electrode for supplying welding energy thereto while it presses the central conductor of the wire against the terminal, to weld the central conductor of the wire to the terminal;

first and second guide means positioned on opposite sides of said electrode, for guiding the wire in extension across the wire-abutting surface of the electrode;

wire storage means positioned to hold the wire so that a portion extends therefrom through said first guide means, then across said electrode, and then through said second guide means; and means for separating both said electrode and guide means from said terminals after the application of welding energy, and for repositioning the electrode and guide means at another terminal and pressing the electrode against the wire to rupture the insulation so the electrode can press directly on the central conductor of the wire and the central conductor presses directly on the terminal;

said second guide means being releasable from the uncut wire when the electrode and guide means moves away from the terminal, so that the guide means can be repositioned without severing the wire.

* * * * *